(12) United States Patent
Cazzaniga et al.

(10) Patent No.: US 9,329,042 B1
(45) Date of Patent: May 3, 2016

(54) INNOVATIVE ANGULAR SENSOR READ-OUT MULTI-AXES DIGITAL FRONT-END CHAIN

(71) Applicant: Maxim Integrated Products, Inc., San Jose, CA (US)

(72) Inventors: Gabriele Cazzaniga, Rosate (IT); Federico Forte, Novara (IT); Luciano Prandi, Novarese (IT)

(73) Assignee: Maxim Integrated Products, Inc., San Jose, CA (US)

( * ) Notice: Subject to any disclaimer, the term of this patent is extended or adjusted under 35 U.S.C. 154(b) by 313 days.

(21) Appl. No.: 13/952,877

(22) Filed: Jul. 29, 2013

Related U.S. Application Data

(60) Provisional application No. 61/750,287, filed on Jan. 8, 2013.

(51) Int. Cl.
G01C 19/56 (2012.01)
G01C 19/5776 (2012.01)

(52) U.S. Cl.
CPC .................. *G01C 19/5776* (2013.01)

(58) Field of Classification Search
CPC ........... G01C 19/5776; G01C 19/5719; G01C 19/5726; G01C 19/5649

USPC ............... 73/504.12, 504.14, 504.16, 504.02, 73/504.04

See application file for complete search history.

(56) References Cited

U.S. PATENT DOCUMENTS

| | | | |
|---|---|---|---|
| 6,946,845 B2 * | 9/2005 | Hetzler | 324/522 |
| 7,240,533 B2 * | 7/2007 | Fell et al. | 73/1.38 |
| 8,912,856 B2 * | 12/2014 | Cazzaniga et al. | 331/154 |
| 2003/0098699 A1 * | 5/2003 | Lemkin et al. | 324/678 |
| 2003/0222511 A1 * | 12/2003 | Hetzler | 307/151 |
| 2008/0190200 A1 * | 8/2008 | Caminada et al. | 73/504.12 |
| 2009/0079607 A1 * | 3/2009 | Denison et al. | 341/143 |
| 2010/0327887 A1 * | 12/2010 | Denison et al. | 324/692 |
| 2011/0146402 A1 * | 6/2011 | Donadel et al. | 73/504.12 |

* cited by examiner

*Primary Examiner* — Helen Kwok
(74) *Attorney, Agent, or Firm* — North, Weber & Baugh LLP

(57) ABSTRACT

The invention relates to a controller, and more particularly, to systems, devices and methods of processing multiple sensor signals of a gyroscope. The signal processor includes: a front end amplifier for converting a signal into a voltage variation signal; at least one analog-to-digital converter coupled to the front end amplifier and operative to convert an analog signal into a digital signal; and at least one demodulator coupled to the analog-to-digital converter and operative to demodulate the digital signal to thereby extract an envelope signal therefrom.

19 Claims, 4 Drawing Sheets

INNOVATIVE ANGULAR SENSOR READ-OUT MULTI-AXES DIGITAL FRONT-END CHAIN

CROSS REFERENCE TO RELATED APPLICATIONS

This application claims the benefit of U.S. Provisional Application No. 61/750,287, entitled "Innovative angular sensor read-out multi-axes digital front-end chain," filed Jan. 8, 2013, which is hereby incorporated herein by reference in its entirety.

BACKGROUND

A. Technical Field

The present invention relates to a signal processor, and more particularly, to systems and methods for processing readout signals from multiple axes of a gyroscope.

B. Background of the Invention

A rate of rotation sensor has been widely applied to measure the angular velocity of a moving object. FIG. 1 shows a schematic diagram 100 of a conventional gyroscope for measuring the rates of rotation of a sensor along three axes. As depicted, gyroscope 100 includes: a sensor unit 102 having multiple sensors 104a, 104b, and 104c disposed along x, y, and z axes, respectively; and a signal processor 108 for processing sensor signals 106a, 106b, and 106c from multiple sensors 104a, 104b, and 104c, respectively. Signal processor 108 includes three front-end (FE) amplifiers 110a, 110b, and 110c; and demodulators 112a, 112b, and 112c, and filters 114a, 114b, and 114c, where each of the FE amplifiers, demodulators, and filters processes one of the multiple sensor signals 106a, 106b, and 106c. The output from each of filters 114a, 114b, and 114c is further processed to read the angular velocity of sensor unit 102 along an axis.

Since signal processor 108 has three FE amplifiers 110a, 110b, and 110c, it has a large form factor and a high power consumption rate as well as high manufacturing cost. Also, signal processor 108 is implemented mostly in analog domain, i.e., it uses more analog components than digital components. For instance, as depicted in FIG. 1, demodulators 112a-112c and filters 114a-114c operate in an analog domain 118, i.e., these components process analog signals. Also, in addition to the typical factory calibrations, other calibrations, such as an offset compensation for temperature variation, are also performed in the analog domain. Since a large portion of the processes in the conventional signal processor 108 are based on analog functions, signal processor 108 has low immunity to process spread while it has increased form factor, power consumption rate and circuit complexity inherent to the analog components.

Therefore, a better solution is needed to address the main issues, including large form factor, low efficiency in power consumption, and circuit complexity of the signal processor of the conventional gyroscopes.

SUMMARY OF THE INVENTION

Various embodiments of the present invention relate to a signal processor, and more particularly, to systems, devices and methods of processing the signals from multiple sensors of a gyroscope. The signal processor has reduced form factor, power consumption rate, and circuit complexity.

One aspect of the invention is a signal processor for processing sensor signals of a gyroscope. The signal processor includes: a front end amplifier for converting a signal into a voltage variation signal; at least one analog-to-digital converter coupled to the front end amplifier and operative to convert an analog signal into a digital signal; and at least one demodulator coupled to the analog-to-digital converter and operative to demodulate the digital signal to thereby extract an envelope signal therefrom.

Another aspect of the invention is a method of processing sensor signals of a gyroscope. The method includes: multiplexing a plurality of readout signals from a plurality of sensors of a gyroscope into a multiplexed signal; converting the multiplexed signal into a voltage variation signal; and demultiplexing the voltage variation signal into a plurality of sensor signals, each of the plurality of sensor signals corresponding to one of the plurality of readout signals.

Certain features and advantages of the present invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

In the following description, for the purpose of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily all referring to the same embodiment.

Furthermore, connections between components or between method steps in the figures are not restricted to connections that are effected directly. Instead, connections illustrated in the figures between components or method steps may be modified or otherwise changed through the addition thereto of intermediary components or method steps, without departing from the teachings of the present invention.

Various embodiments of the invention relate to a signal processor, and more particularly, to systems, devices and methods of processing readout signals from multiple sensors (such as, multiple sensing electrodes) of a gyroscope. The mass movement is sensed through capacitance, charge or current variations at the multiple sensing electrodes. The readout signals from the multiple sensing electrodes are multiplexed and converted into a voltage variation by a front end amplifier. Then, the voltage variation is demultiplexed into multiple sensor signals. Each sensor signal is dechopped and converted into a digital signal and the digital signal is further processed to measure the rate of rotation of the gyroscope along an axis.

Figure 1:
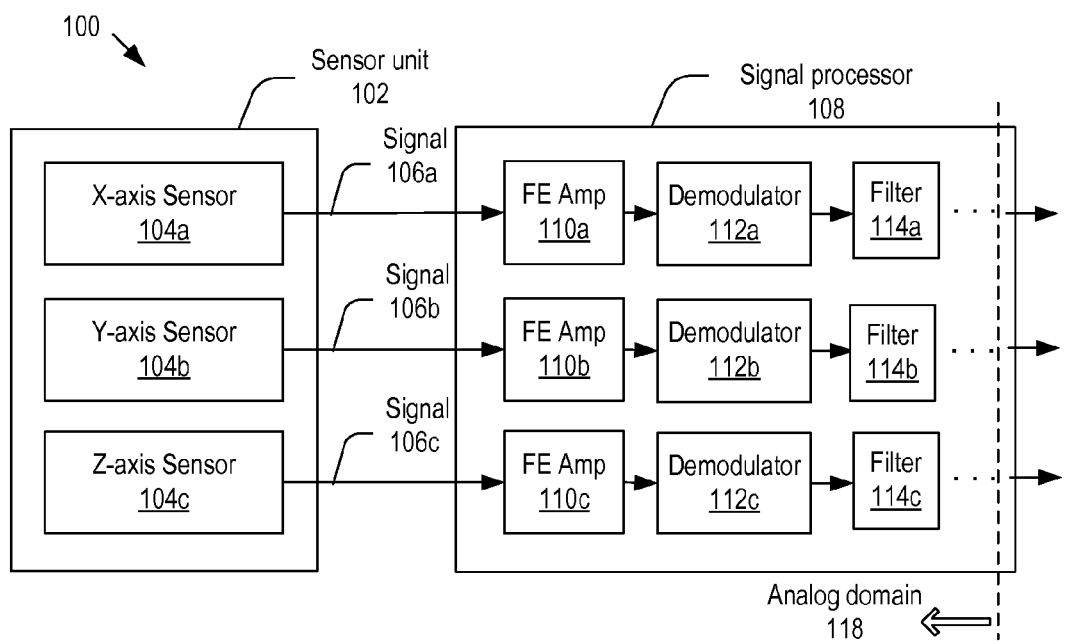
FIG. 1 illustrates a block diagram of a conventional signal processor.
Figure 2:
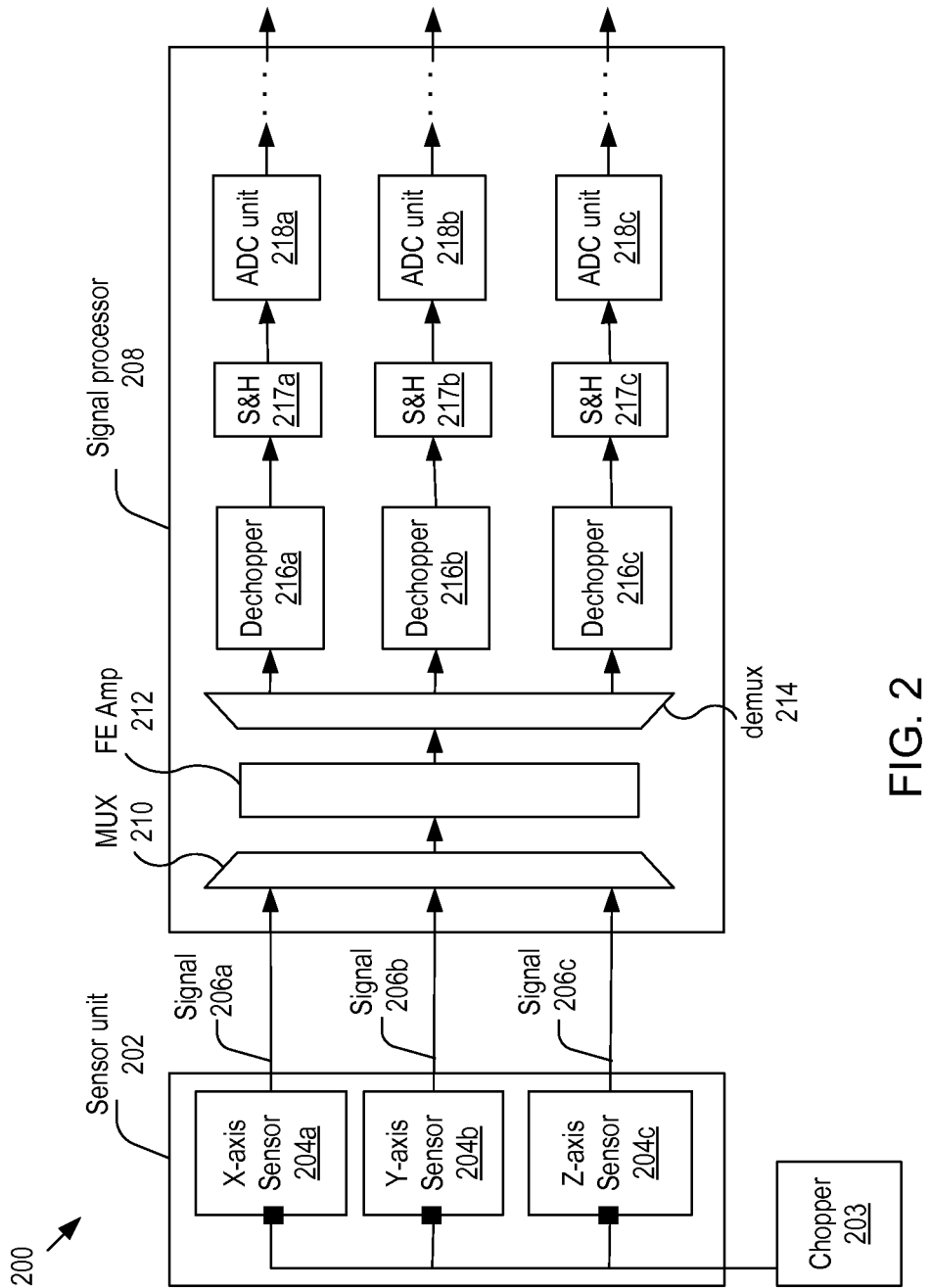
FIG. 2 illustrates an exemplary block diagram of a gyroscope according to one embodiment of the present invention.

FIG. 2 illustrates an exemplary block diagram 200 of a gyroscope for measuring rates of rotation according to one embodiment of the present invention. For the purposes of illustration, the block diagram 200 is considered to represent a gyroscope. However, it should be apparent to those of ordinary skill in the art that signal processor 208 may be applied to any other suitable device that has multiple sensors without deviating from the scope of the present invention.

As depicted, gyroscope 200 includes: a sensor unit 202 having x-, y-, and z-axis sensors 204a, 204b, and 204c; and a signal processor 208 for processing readout signals 206a, 206b, and 206c from sensors 204a, 204b, and 204c, respectively. Each sensor generates a readout signal in response to the displacement of a mass (not shown in FIG. 2) in sensor unit 202. Then, the readout signals are chopped by a chopper 203 coupled to the sensors, and the chopped readout signals 206a, 206b, and 206c are input to signal processor 208, and more particularly, to a multiplexer 210. Chopper 203 may be any suitable chopper circuit, such as chopper amplifier, that is known to those of ordinary skill in the art. The chopper 203 and dechoppers 216a-216c are optional. Readout signals 206a, 206b, and 206c may be any suitable types of electrical signals, such as charge variations, that are commensurate with the displacements of the mass.

Readout signals 206a, 206b, and 206c are multiplexed by a multiplexer 210. Multiplexer 210 performs the time-division multiplexing and the frequency, $f_{FE}$, of the time division multiplexing is an integer multiple of the resonating drive frequency, $f_D$, of the resonating mass of sensor unit 202. Thus, the sampling frequency for each readout signal is calculated by an equation:

$$f_{FECH} = N^* f_D/3, \quad (1)$$

where N is an integer number.

Multiplexer 210 sends the multiplexed signal to a front end (FE) amplifier 212. In embodiments, the readout signals are charge variations, and the multiplexed signal is also a charge variation. Then, FE amplifier 212 converts the charge variation into a voltage variation, i.e., three readout signals 206a, 206b, and 206c are multiplexed and then, the multiplexed signal is converted into a voltage variation by FE amplifier 212

The output signal from FE amplifier 212 is input to a demultiplexer 214 that may be conjugate to multiplexer 210. Demultiplexer 214 separates the multiplexed signal into three sensor signals and sends the sensor signals to three dechoppers 216a, 216b, and 216c, respectively. Dechoppers 216a, 216b, and 216c dechop the sensor signals output from demultiplexer 214. Dechoppers 216a, 216b, and 216c may operate at the same frequency as chopper 203. The chopper 203 and dechoppers 216a-216c are optional.

The output signals from the dechoppers 216a, 216b, and 216c are input to Sample & Holds 217a, 217b, and 217C, then to analog-to-digital (ADC) units 218a, 218b, and 218c. It is noted that each of the Sample & Holds can be replaced by a suitable analog filter. Each of ADC units 218a, 218b, and 218c converts the dechopped sensor signal into a digital signal. Then, as discussed in more detail in conjunction with FIGS. 3A and 3B, the digital signal is further processed by various components to extract the displacement signal of the mass therefrom, where the displacement signal refers to the signal commensurate with the displacement of the mass.

It is noted that, unlike the conventional gyroscope 100, signal processor 208 uses a pair of multiplexer and demultiplexer so that only one FE amplifier 212 is used to process three readout signals. Since gyroscope 200 has only one FE amplifier, gyroscope 200 has reduced form factor and power consumption rate, providing advantages in implementing gyroscope 200 into small-sized devices. Also, the manufacturing cost of gyroscope 200 is lower than that of conventional gyroscope 100. Furthermore, in embodiments, demultiplexer 214 can be moved after ADC converter, allowing gyroscope 200 to have unique analog chain for all the three axes, in time division multiplexing, wherein the chain includes: multiplexer, FE amplifier, dechopper (optional), Sample and Hold (optional), ADC converter.

Figure 3A:
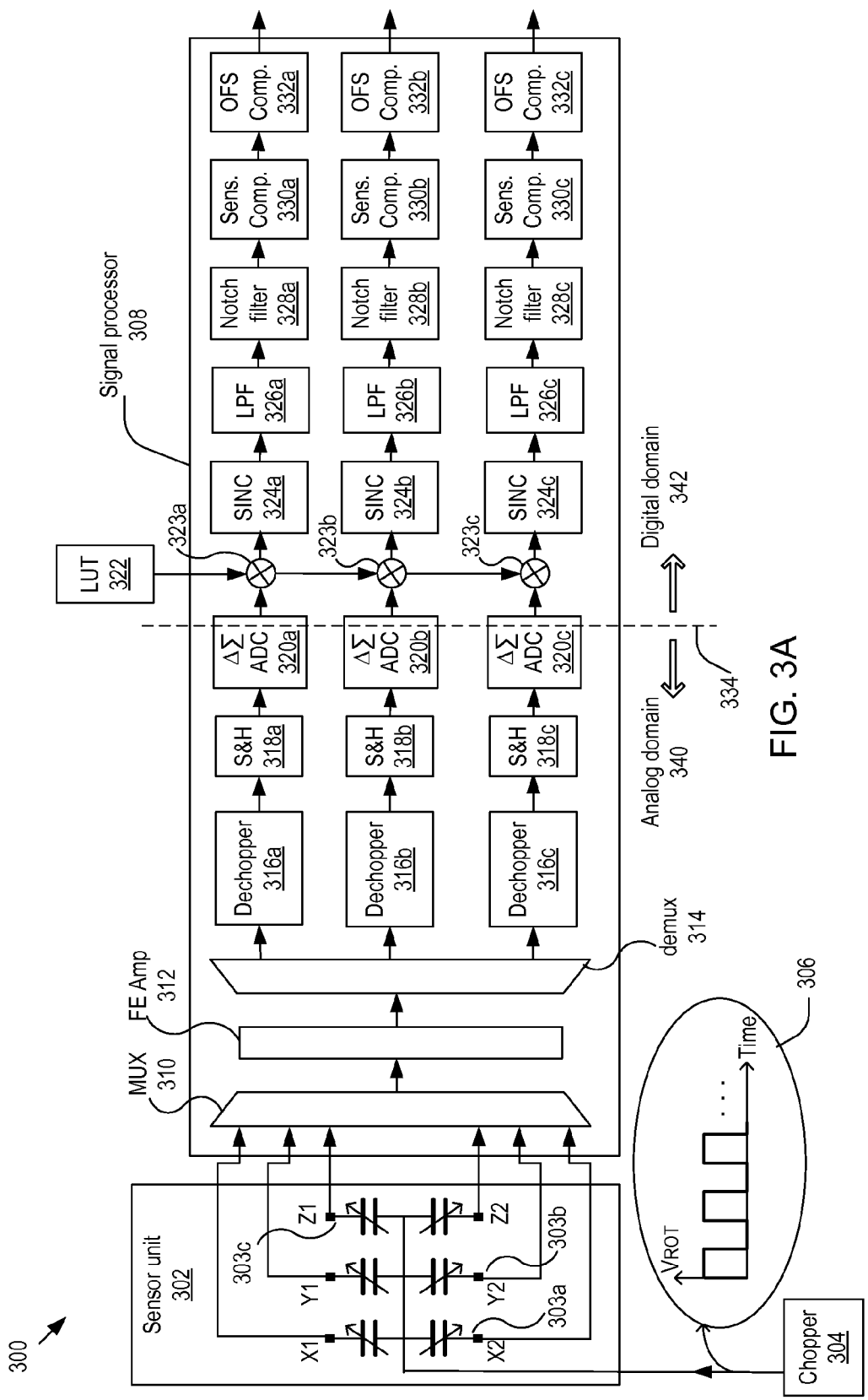
FIG. 3A illustrates a detailed block diagram of the gyroscope in FIG. 2.
Figure 3B:
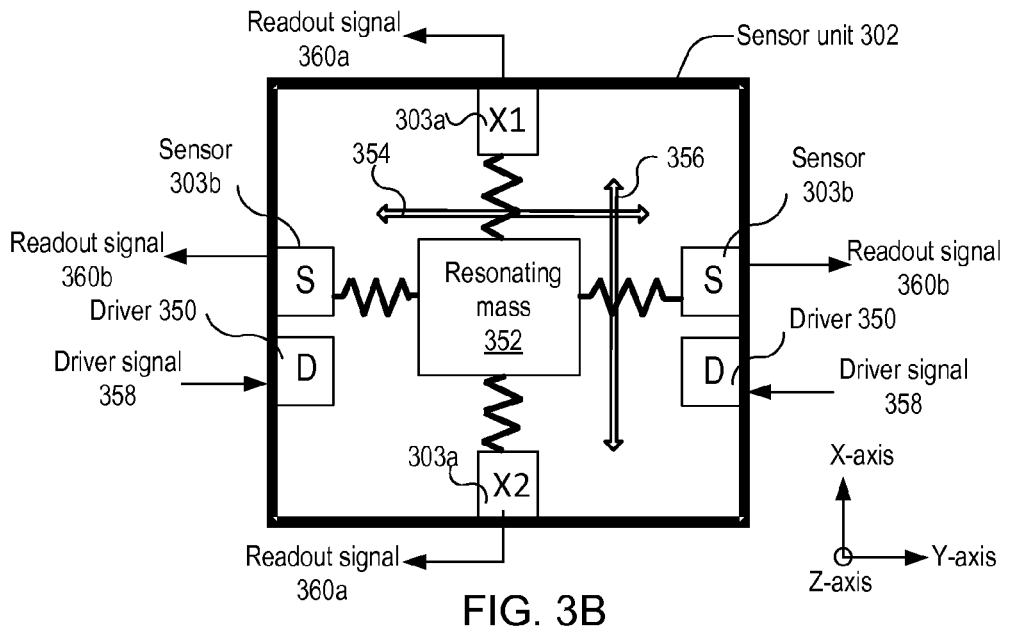
FIG. 3B illustrates a detailed block diagram of the sensor unit in FIG. 3A.

FIG. 3A illustrates a detailed block diagram 300 of gyroscope 200 in FIG. 2. FIG. 3B illustrates the electro-mechanical features of sensor unit 302. As depicted in FIGS. 3A-3B, sensor unit 302 includes: a resonating mass 352 suspended in space by a suitable suspension mechanism, such as springs; two sets of sensing electrodes (or, shortly sensors) 303a and 303b; and a set of drivers 350 for actuating resonating mass 352 along drive-axis. As discussed below, resonating mass 352 is continuously oscillated at a frequency so that sensors 303b can detect displacements of resonating mass 352 along the drive-axis, forming a closed loop. Sensors 303a measure the displacement of mass 352 along x-axis due to the Coriolis force when gyroscope 300 rotates. For brevity, the other two sets of sensing electrodes for sensing the displacement in the y and z directions, such as sensing electrode 303c, are not shown in FIG. 3B. Sensing electrodes 303a and 303b may be capacitive electrodes that are responsive to displacements of the mass 352 and operative to generate and output readout signals, such as 360a and 360b. The pair of drivers 350 may be also capacitive electrodes that excite resonating mass 352 in response to driver signal 358.

It is noted that signal processor 308 is agnostic as to the sensor type, i.e., sensor unit 302 may be any suitable type of device for measuring various physical quantities.

Gyroscope 300 includes a chopper 304 for applying a chopper signal shown in an inset diagram 306. As depicted in inset diagram 306, chopper 304 generates and applies square waves to common electrodes of a set of half bridge capacitive sensors, commonly called rotor. More specifically, when the square waves having a rotor voltage, $V_{ROT}$, are applied to the rotor, the charge exchange between the sensor and a charge amplifier occurs, i.e., chopper 304 enables the FE amplifier 312 to read the amount of charge in the capacitor electrodes 303a.

Chopper 304 compensates unwanted offset that the output signal from the charge amplifier would have. Also, it compensates noises due to unwanted current leakages from the charge amplifier. When the unwanted current leakages occur at a low frequency, chopper 304 averages out the noises over time to thereby reduce the noises. Furthermore, chopper 304 may reduce the flicker noises in the output signal from sensing electrode 303a.

In embodiments, the frequency, $f_{ROT}$, of the square waves in inset diagram 306 is an integer multiple of the frequency, $f_D$, for actuating (or, equivalently, driving) resonating mass 352. For instance, $f_{ROT}$ is ten times $f_D$. $f_D$ is the same as the resonance frequency of resonating mass 352, i.e., resonating mass 352 is actuated at its resonance frequency. It is because the response of a spring-mass system to a driving force is peaked at the resonance frequency.

The readout signals, which are chopped sensor signals, are input to signal processor 308, more specifically, a multiplexer 310. Multiplexer 310 is similar to multiplexer 210, i.e., it multiplexes three readout signals from sensor unit 302 in time division and operates at a frequency, $f_{FE}$, where $f_{FE}$ is an integer multiple of the frequency, $f_D$, for actuating (or, equivalently, driving) resonating mass 352. As discussed above, the sampling rate, $f_{FECH}$, for each readout signal is calculated by equation (1).

The output signal from multiplexer 310 is input to a front end (FE) amplifier 312. FE amplifier 312 converts the charge variation of the multiplexed signal into a voltage variation, where the charge variation is commensurate with the displacement variation of mass 352. FE amplifier 312 may be any suitable type of circuit, such as charge amplifier, that is known to those of ordinary skill in the art and able to process the chopped readout signal. If sensing electrodes 303a generate current variations in response to the displacement variations of mass 352, FE amplifier 312 may be a trans-impedance amplifier.

The output signal from FE amplifier 312 is input to a demultiplexer 314 that is conjugate to multiplexer 310. Demultiplexer 314 separates the output signal from FE amplifier 312 into three sensor signals and sends the sensor signals to three dechoppers 316a, 316b, and 316c. Dechoppers 316a, 316b, and 316c dechop the sensor signals from demultiplexer 314, and, in embodiments, they may operate at the same frequency as chopper 304.

The output signals from dechoppers 316a, 316b, and 316c are input to three optional Sample & Holds 318a, 318b, and 318c, respectively. Each Sample & Hold is a circuit that samples the voltage of a continuously varying analog signal, holds its value at a constant level for a specified minimal period of time, and releases the value as output signal. The three output signals from Sample & Holds 318a, 318b, and 318c are input to three analog-to-digital converters (ADC) 320a, 320b, and 320c, respectively, where each of the three ADCs 320a, 320b, and 320c may be a switched capacitor or a continuous time band pass sigma-delta converter, although other suitable type of analog-to-digital converter may be used. ADCs 320a, 320b, and 320c may operate at a sampling frequency, $f_{ADC}$, which is an integer multiple of the driver frequency, $f_D$, i.e., $f_{ADC}$ can be expressed by:

$$f_{ADC}=M*f_D, \qquad (2)$$

where M is an integer number equal or larger than N in equation (1).

The digitized sensor signals from ADCs 320a, 320b, and 320c are demodulated by demodulators 323a, 323b, and 323c so that the angular rate signals are extracted. In embodiments, each of the digital signals may be demodulated through a digitally represented periodical waveform, such as sinusoidal waveform. The periodical waveform samples may be stored in a lookup table (LUT) 322. In FIG. 3A, symbols 323a, 323b, and 323c represent the demodulators.

The three demodulated signals may be low pass filtered, for instance, they are input to SINC decimation filters 324a, 324b, and 324c and/or additional low pass filters (LPF) 326a, 326b, and 326c, respectively, so that noises in the demodulated signals can be filtered. Then, the output signals from LPFs 326a, 326b, and 326c are input to optional notch filters 328a, 328b, and 328c to filter a noise at a spurious frequency, $|f_D-f_s|$, where $f_s$ is the resonating frequency in the sensor readout direction. Resonating mass 352 is continuously actuated/driven by drivers 350 along the direction of arrow 354 so that resonating mass 352 oscillates along the drive-axis. When sensor unit 302 rotates along the z-axis, resonating mass 352 moves along the direction of an arrow 356, i.e., sensor readout direction, due to the Coriolis force, and this movement is measured by the sensing electrodes 303a to thereby measure the rate of rotation along the z-axis. As discussed, FIG. 3B shows sensors and drivers for measuring Coriolis force in only one direction. To measure Coriolis force in three directions, multiple sensing electrodes may be used in the sensor unit 302.

The displacement of mass 352 along x-axis is measured by the sensing electrodes 303a. It is possible that the signal 360a may include spurious noise at frequency, $f_s$. Three optional notch filters 328a, 328b, and 328c are used to filter the noises at the spurious frequencies. The intensity of the spurious noise becomes large when resonating mass 352 is disturbed by an external force. Thus, notch filters 328a, 328b, and 328c provide good immunity to external shock events.

The output signals from notch filters 328a, 328b, and 328c are input to optional sensitivity compensators 330a, 330b, and 330c and optional offset compensators 332a, 332b, and 332c, respectively. Sensitivity compensators 330a, 330b, and 330c adjust the amplitudes (or, equivalently, intensity) of their input signals so that the amplitude gain and/or loss caused by one or more components of sensor and signal processor 308 is compensated. Offset compensators 332a, 332b, and 332c adjust the DC level of their input signals so that the DC non-idealities, such as temperature fluctuation, are compensated. It is noted that, unlike the conventional gyroscopes that typically have calibration components in the analog domain, the main calibration mechanisms, i.e., sensitivity compensators 330a, 330b, and 330c and offset compensators 332a, 332b, and 332c, of signal processor 308 operate in digital domain 342, reducing the area, test time, and power consumption rate. It is also noted that ADCs 320a, 320b, and 320c may perform oversampling. Oversampling is the operation of re-sampling a digital sampled signal at a different sampling rate, higher than the original one. Oversampling reduces the quantization noise at low frequencies. The oversampling allows filters 324a, 324b, and 324c and 326a, 326b, and 326c and 328a, 328b, and 328c to be located in digital domain 342, yielding further reduction in area and power consumption rate.

It should be apparent to those of ordinary skill that signal processor 308 may include other suitable type and number of filters. Also, the output signals from SINC decimation filters 324a, 324b, and 324c may be processed in a different sequence from that depicted in FIG. 3A. For instance, the sequential order of LPF 326a, notch filer 328a, sensitivity compensator 330a, and offset compensator 332a, may be varied without deviating from the scope of the present invention.

As discussed above, the conventional signal processor 108 is implemented mostly in analog domain 118, i.e., the conventional controllers have mostly analog components. In contrast, the signal processor 308 includes components in both analog and digital domains. In FIG. 3A, a broken line 334 separates analog domain 340 from digital domain 342, where the analog (or digital) domain refers to a section that includes only analog (or digital) components. As depicted, the components in digital domain 340 are used in place of their analog counterparts, reducing the complexity in circuit design significantly. Also, the mixed signal solution with high digital content allows product differentiation, high profitability, improved performance, and reductions in area, power consumption rate, and manufacturing cost.

Figure 4:
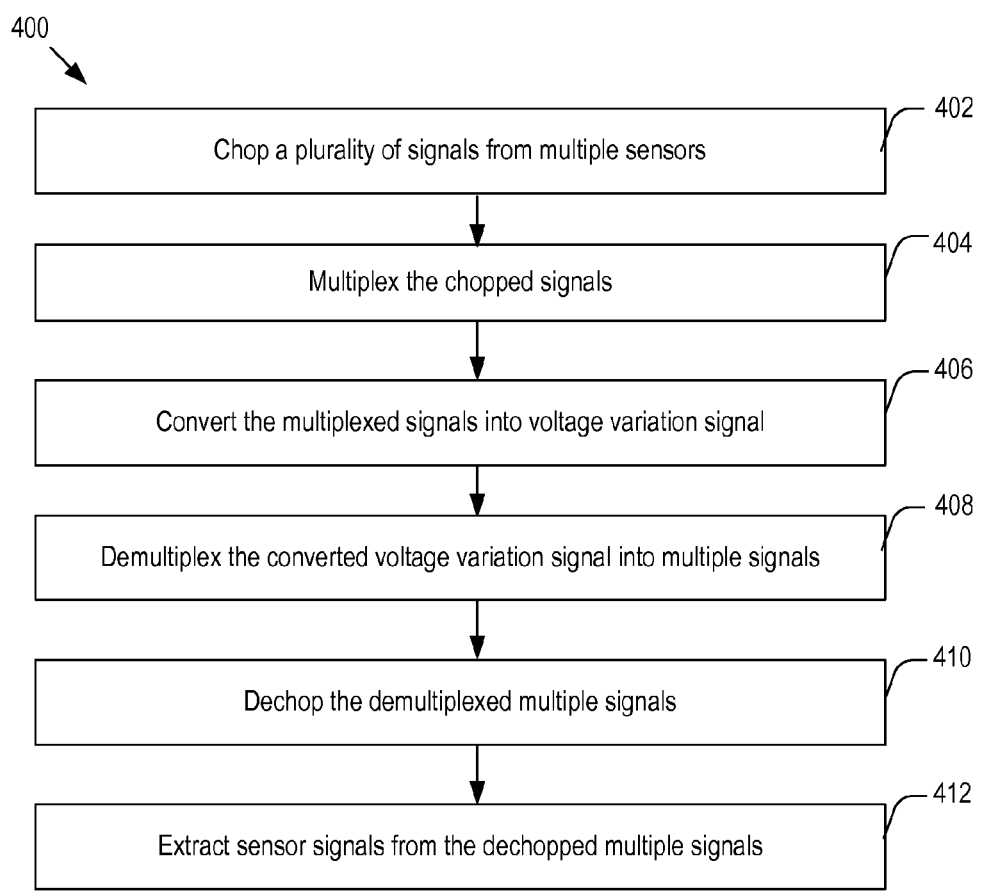
FIG. 4 is a flowchart of an illustrative process for processing sensor signals according to one embodiment of the present invention.

FIG. 4 is a flowchart 400 of an illustrative process for processing sensor signals of a gyroscope according to one embodiment of the present invention. The process begins at step 402 by optionally chopping multiple readout signals generated by multiple sensing electrodes of the gyroscope, where each readout sensor signal represents the displacement of the mass along one direction.

Then, at step 404, the chopped signals are multiplexed in time division into one signal. Next, at step 406, the multiplexed signal is converted into a voltage-variation signal by a front end amplifier. The front end amplifier may be a charge amplifier or a trans-impedance amplifier, depending on the type of the multiple readout signals.

At step 408, the output signal from the front end amplifier is demultiplexed into multiple sensor signals. It is noted that, unlike conventional gyroscopes, only one front end amplifier is used to process multiple readout signals by using a pair of multiplexer and demultiplexer, reducing the form factor and power consumption rate of the gyroscope. Then, the demultiplexed sensor signals are optionally dechopped at step 410. Subsequently, the dechopped signals are processed to extract the displacement information of the resonating mass at step 412.

At step 412, sensor signals are extracted from the dechopped multiple signals. Step 412 may include several steps: converting the analog sensor signals into digital format; demodulating the digitized sensor signals to extract envelopes (or, equivalently, envelop signals) of the amplitudes of the digitized sensor signals; and filtering the extracted envelopes.

It should be understood, of course, that the foregoing relates to exemplary embodiments of the invention and that modifications may be made without departing from the spirit and scope of the invention as set forth in the following claims.

What is claimed is:

1. A signal processor for processing sensor signals from a plurality sensors of a gyroscope, comprising:
   a multiplexer coupled to the plurality of sensors, responsive to a plurality of readout signals from the plurality of sensors, and operative to generate a multiplexed signal;
   a front end amplifier for converting the multiplexed signal into a voltage variation signal;
   a demultiplexer coupled to the front end amplifier and operative to demultiplex the voltage variation signal into a plurality of signals;
   at least one analog-to-digital converter coupled to the demultiplexer and operative to convert the plurality of signals into a plurality of digital signals; and
   at least one demodulator coupled to the at least one analog-to-digital converter and operative to demodulate the plurality of digital signals to thereby extract envelope signal therefrom.

2. The signal processor according to claim 1, wherein the at least one analog-to-digital converter is a band-pass sigma delta converter or a low-pass sigma delta converter.

3. The signal processor according to claim 1, further comprising:
   a chopper coupled to the plurality of sensors and operative to chop the plurality of readout signals; and
   at least one dechopper coupled to the chopper and operative to generate dechopped signals.

4. The signal processor according to claim 1, 2, or 3, further comprising:
   at least one analog filter coupled to the front end amplifier and operative to filter a signal.

5. The signal processor according to claim 4, wherein the at least one analog filter is a Sample & Hold.

6. The signal processor according to claim 1, further comprising:
   one or more filters responsive to the envelope signal and operative to filter a noise from the envelope signal.

7. The signal processor according to claim 6, wherein the one or more filters include at least one of a SINC decimator filter, a low pass filter, and a notch filter.

8. The signal processor according to claim 6, wherein the one or more filters are operative to filter a spurious noise generated at a frequency that is a difference between a sensing resonant frequency and a driver frequency of the gyroscope.

9. The signal processor according to claim 1 or 6, further comprising:
   one or more sensitivity compensators responsive to the envelope signal and operative to adjust intensities of the envelope signal.

10. The signal processor according to claim 1, 6, or 9, further comprising:
    at least one offset compensator operative to adjust DC levels of unwanted DC signals or DC offsets over the envelop signal under detection.

11. The signal processor according to claim 1, wherein each of a plurality of readout signals from the plurality of sensors includes a capacitance variation and the front end amplifier is a charge amplifier.

12. The signal processor according to claim 1, wherein each of a plurality of readout signals from the plurality of sensors includes a current variation and the front end amplifier is a trans-impedance amplifier.

13. A method of processing sensor signals from a gyroscope, comprising:
    multiplexing a plurality of readout signals from a plurality of sensors of a gyroscope into a multiplexed signal;
    converting the multiplexed signal into a voltage variation signal;
    demultiplexing the voltage variation signal into a plurality of sensor signals, each of the plurality of sensor signals corresponding to one of the plurality of readout signals;
    converting the plurality of sensor signals into digital sensor signals; and
    demodulating the digital sensor signals to extract envelop signals therefrom.

14. The method according to claim 13, further comprising:
    chopping the plurality of readout signals; and
    dechopping the plurality of sensor signals.

15. The method according to claim 14, further comprising:
    sampling the dechopped sensor signals.

16. The method according to claim 13, further comprising:
    filtering a noise contained in the envelope signals.

17. The method according to claim 16, further comprising:
    adjusting intensities of the envelope signals and adjusting DC levels of the envelop signals.

18. The method according to claim 13, wherein each of the plurality of readout signals includes a capacitance variation.

19. The method according to claim 13, wherein each of the plurality of readout signals includes a current variation.

\* \* \* \* \*